US006314422B1

(12) United States Patent
Barker et al.

(10) Patent No.: US 6,314,422 B1
(45) Date of Patent: Nov. 6, 2001

(54) METHOD FOR SOFTLINKING BETWEEN DOCUMENTS IN A VEHICLE DIAGNOSTIC SYSTEM

(75) Inventors: Robert L. Barker, Oxford; Scott A. Blaine, Grosse Pointe Woods; Frank J. Cernak, III, Sterling Heights; Robert J. Knox, Clarkston, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 08/987,789

(22) Filed: Dec. 9, 1997

(51) Int. Cl.[7] .................................................. G06F 17/30
(52) U.S. Cl. ............................ 707/10; 707/2; 707/3; 707/501; 701/29; 701/32; 701/35; 709/218; 709/227; 709/228; 705/26; 705/27; 340/539
(58) Field of Search .................................... 707/3, 2, 501; 710/260; 705/26; 709/227; 395/200.49; 701/35, 29, 30, 31, 32, 33, 34; 340/539

(56) References Cited

U.S. PATENT DOCUMENTS

| | | | | |
|---|---|---|---|---|
| 5,157,610 | * | 10/1992 | Asano et al. ............................ | 701/32 |
| 5,442,549 | * | 8/1995 | Larson ..................................... | 701/35 |
| 5,479,347 | * | 12/1995 | Oguro et al. ............................ | 701/35 |
| 5,483,652 | * | 1/1996 | Sudama et al. ......................... | 707/10 |
| 5,563,579 | * | 10/1996 | Carter ..................................... | 340/539 |
| 5,774,361 | * | 6/1998 | Colarelli, III et al. ................. | 701/29 |
| 5,787,254 | * | 7/1998 | Maddalozzo, Jr. et al. ........... | 709/228 |
| 5,826,253 | * | 10/1998 | Bredenberg .............................. | 707/2 |
| 5,873,077 | * | 2/1999 | Kanoh et al. ............................ | 707/3 |
| 5,884,035 | * | 3/1999 | Butman et al. ......................... | 709/218 |
| 5,884,202 | * | 3/1999 | Arjomand ................................ | 701/29 |
| 5,916,287 | * | 6/1999 | Arjomand . | |
| 5,918,214 | * | 6/1999 | Perkowski ............................... | 705/27 |
| 5,931,935 | * | 8/1999 | Cabrera et al. ......................... | 710/260 |
| 5,950,173 | * | 9/1999 | Perkowski ............................... | 705/26 |
| 5,964,813 | * | 10/1999 | Ishii et al. ............................... | 701/35 |
| 5,991,753 | * | 11/1999 | Wilde ....................................... | 707/2 |
| 6,003,085 | * | 12/1999 | Ratner et al. ........................... | 709/227 |
| 6,006,018 | * | 12/1999 | Burnett et al. .......................... | 395/200.49 |
| 6,049,269 | * | 4/2000 | Byrd et al. .............................. | 340/426 |
| 6,052,631 | * | 4/2000 | Busch et al. ............................ | 701/29 |

FOREIGN PATENT DOCUMENTS

| | | | | |
|---|---|---|---|---|
| 2715745 | * | 4/1995 | (FR) ................................. | G06F/11/30 |
| 3283842 A | * | 12/1991 | (JP) .................................. | G06F/11/30 |
| 9923783 A2 | * | 10/1997 | (WO) ............................... | G06F/11/30 |

OTHER PUBLICATIONS

Tsugawa "Driving control of autonomous vehicles with vehicle–to–vehicle communication", journal vol. 26, No. 9, pp. 1058–1065, Sep. 1990.*
D'Inverno, "A Z spefication of the soft–link hypertext model", IEEE, X+433 pp. Apr. 1997.*
Donlon, "Mr. Network", journal: CHE n112, pp. 40–44, Apr. 1996.*
Slocum, G. K. "Aerospace Technology helps shape tomorrow's cars", Machine design V64 No. 24, pp. 96–100, Dec. 1992.*
Frost & Sullivan "Remote vehicle diagnostic markets:Strategic Analysis", Dec. 1999.*
*Mopar Diagnostic System (MDS) User's Guide*, Chrysler Corporation, Sep. 1993 pp. 1–1 thru 1–22, 2–1, 3–8 thru 3–18, 4–1, 5–1 and 6–1.

* cited by examiner

*Primary Examiner*—Jean M. Corrielus
(74) *Attorney, Agent, or Firm*—Mark P. Calcaterra

(57) ABSTRACT

A method is provided for accessing files on a client node which is connected to a server node across a network channel. A first file is displayed on the client node, and context information indicative of this first document is stored. Rather than using a "hard" link which specifies a specific path/filename, a dynamic softlinking process is used to access a second file. A link, similar to a hyperlink, can be selected on the first displayed file to access a second file, where the link includes information indicative of the second file. To determine a file identifier for the second document, a data structure, having a plurality of file identifiers, is accessed using the context information and link information. The second file can then be retrieved from the server node via the network channel using the file identifer and displayed on the client node.

12 Claims, 13 Drawing Sheets

FIG. 6

METHOD FOR SOFTLINKING BETWEEN DOCUMENTS IN A VEHICLE DIAGNOSTIC SYSTEM

BACKGROUND OF THE INVENTION

1. Field of the Invention

The present invention relates generally to a computer-implemented system for providing vehicle information to service technicians, and more particularly to a system for providing vehicle information to service technicians using standard server/browser technology across a network channel.

2. Discussion

Automotive vehicle repairs are a primary function of automotive dealerships. Service managers, warranty clerks, parts clerks and service technicians utilize various information systems as tools for providing better customer service to vehicle owners in relation to repair services. In particular, technical vehicle information, warranty and vehicle history information, parts information and diagnostic information are needed to facilitate service at the dealership level. This information may be distributed amongst numerous existing information systems which are each centrally located at the manufacturer level. To distribute this information, custom designed dealerships systems may be configured as stand alone computers that are periodically updated or multiple computers connected to a server computer across a proprietary network.

Therefore, it is desirable to provide an integrated system of vehicle and diagnostic information that has the purpose of providing dealerships with the information and tools necessary to diagnose and repair vehicle problems. An integrated vehicle information system at the dealership level provides quick access to (corporate) technical service information, helps technicians to diagnose problems quickly, and enable technicians to make better decisions about what services to perform so that repairs are done correctly.

It is another object of the present invention to use commercial, off-the-shelf software products and standard (WEB) server/browser technology that is so prevalently used on the Internet to provide an easily portable system.

It is also another object of the present invention to provide a vehicle information system that allows a technician or other system user to save and restore diagnostic "sessions", so that the technician's work on a vehicle may be set aside and later continued (ie. after the vehicle owner has been contacted and authorizes appropriate repairs) without being lost.

Further it is another object of the present invention to provide a data structure where information elements although identical for multiple vehicles are stored and maintained only once and yet attributed and accessed for each vehicle using dynamic softlinking.

It is yet another object of the present invention to provide a graphical user interface with extensions, including a tab metaphor, context sensitive switching between tabs and dynamic softlinking between documents in a tab, which improves navigation and usability in the system.

SUMMARY OF THE INVENTION

To achieve the foregoing objectives, the present invention is a method of accessing files on a client node connected to a server node across a network channel. A first file is displayed on the client node and context information indicative of this first document is stored. A link can be selected on the first displayed file to access a second file, where the link includes information indicative of the second file. To determine a file identifier for the second document, a data structure, having a plurality of file identifiers, is accessed using the context information and link information. The second file can then be retrieved from the server node via the network channel using the file identifer and displayed on the client node.

BRIEF DESCRIPTION OF THE DRAWINGS

Additional advantages and features of the present invention will become apparent to those skilled in the art upon reading the following detailed description and upon reference to the drawings in which:

FIG. 6 illustrates an exemplary user interface from the vehicle diagnostic system of the present invention;

DETAILED DESCRIPTION OF THE PREFERRED EMBODIMENTS

The following description of the preferred embodiment is merely exemplary in nature and is in no way intended to limit the invention or its application or its uses.

Figure 1:
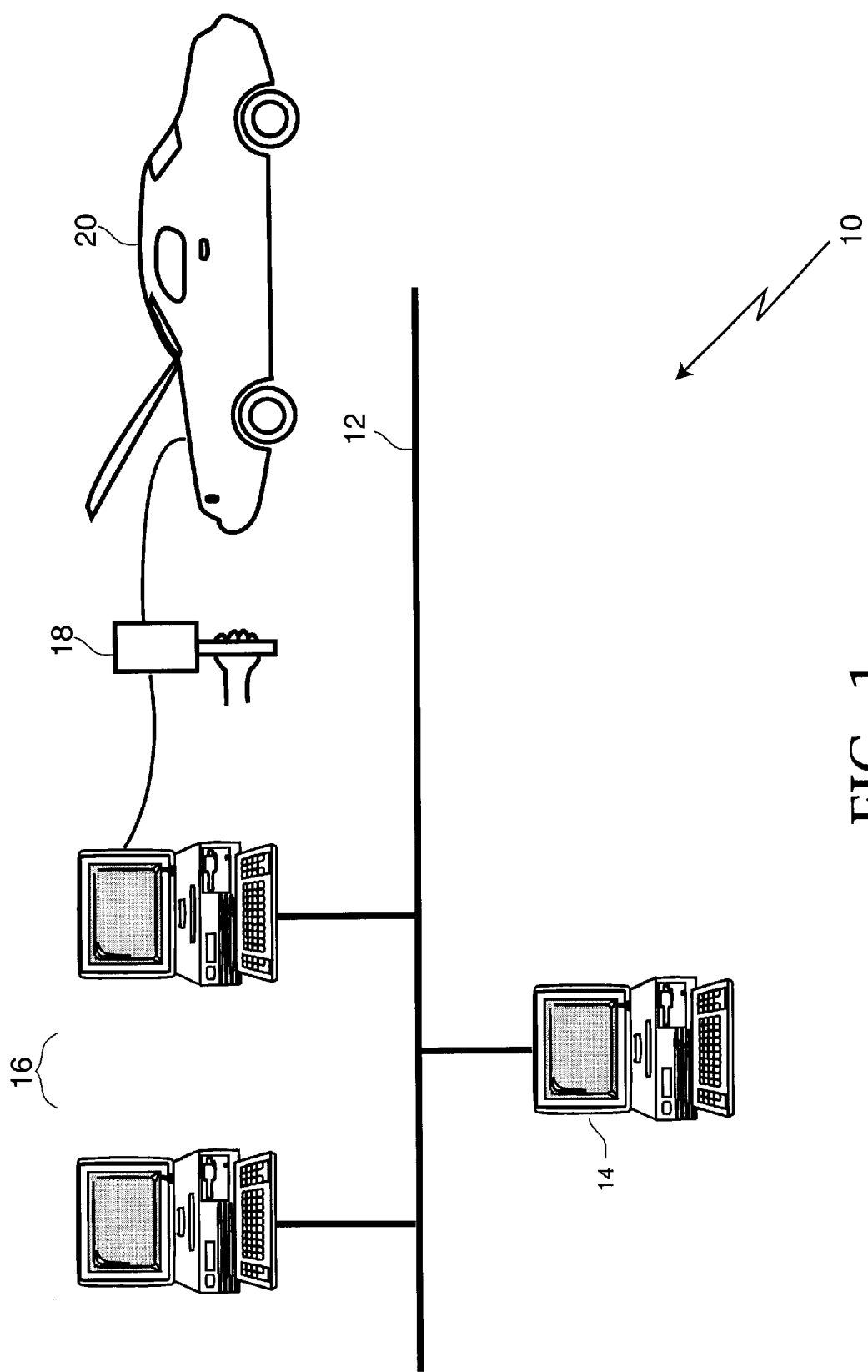
FIG. 1 is a diagram illustrating the components of the vehicle diagnostic system in the present invention.

Vehicle diagnostic system (VDS) provides integrated diagnostics, tools, and service information to a service technician across a network channel 12. As shown in FIG. 1, VDS 10 is a distributed system, consisting of a server 14 and one or more clients 16. To facilitate diagnostic functionality in VDS 10, a diagnostic tool 18 may be coupled between a vehicle 20 and one of the clients 16. VDS is based on commercial, off-the-shelf software products, extending these products as necessary to meet the VDS requirements. Standard WEB server/browser technology underlies VDS 10. In the present invention, clients 16 are running Netscape browser-based applications on a Windows NT operating system that are connected to a UNIXware server running Netscape server across an Ethernet network. The capability of these components are enhanced by the use of Java and Javascript language interpreters, both server-side and client-side. As will be apparent to one skilled in the art, VDS could be developed using other browser applications, programming languages, scripting languages and network configurations.

Figure 2:
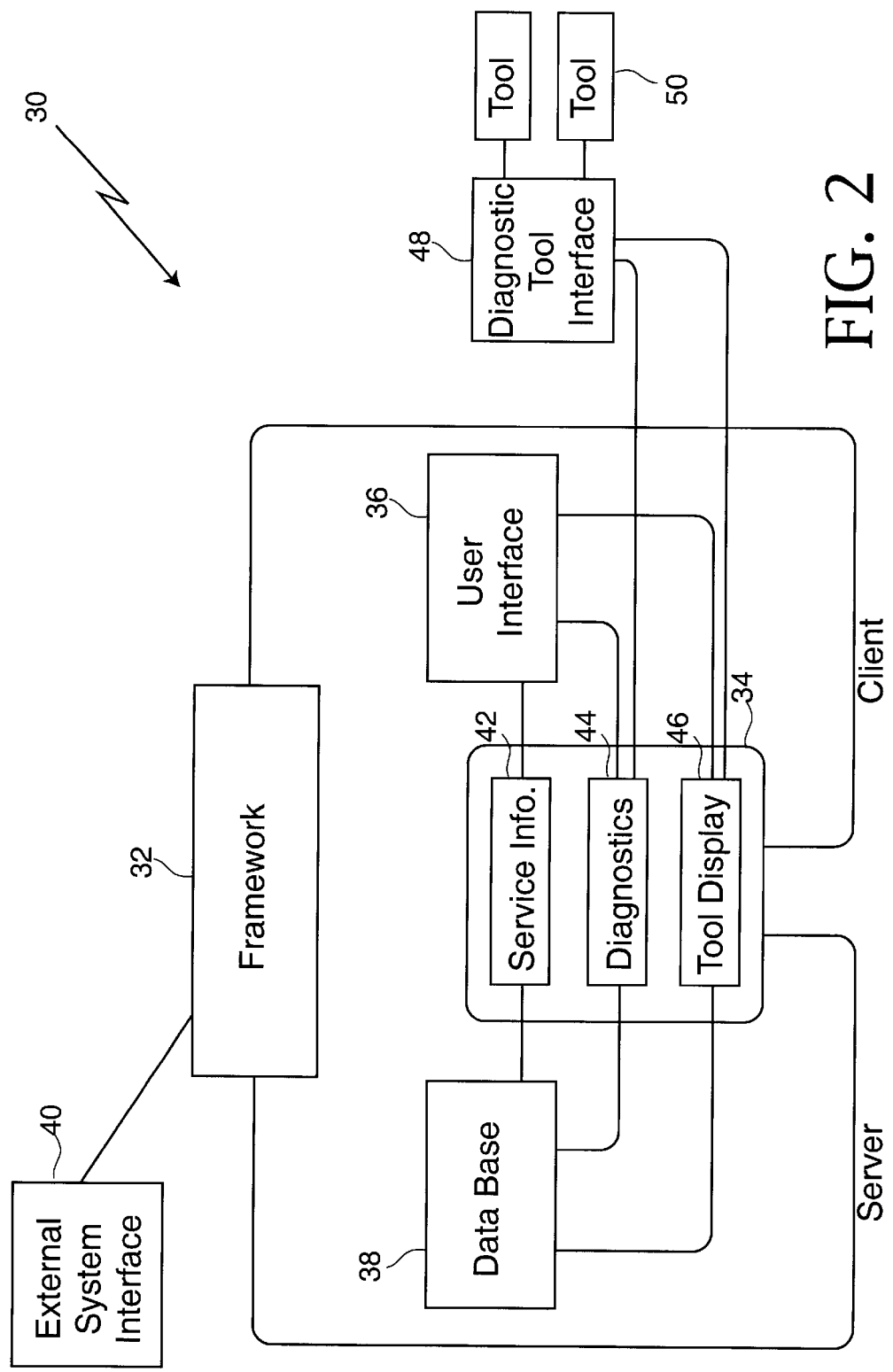
FIG. 2 is a block diagram showing the primary elements of the architecture for the vehicle diagnostic system of the present invention.

To provide an overview of VDS 10, the primary elements of the VDS 10 and their relationship with each other are shown in FIG. 2. A framework element 32 is central to the enhanced functionality of VDS 10. Framework 32 provides the foundation for VDS application elements 34, and is responsible for the control of these elements. Framework 32 is also associated with a user interface 36 for interacting with a service technician. Framework 32 responsibilities include: managing a technicians diagnostic session with a vehicle which involves a "change vehicle" function, as well as the functions of saving the state of a session in a database 38 and restoring it as directed by the technician; requesting information from external systems, and storing the information stored by these external entities in database 38; coordinating the presentation of information from application elements 34 (so called "tab management") so that switching from the display of one of these types of information to another supports the technicians work flow; and providing support functions that are common to other VDS elements, such as technician notes, error logging, and printing.

A service information element 42 allows the technician to browse information that is specific to the vehicle being diagnosed. The different types of information (e.g., service manuals, wiring diagrams, technical service bulletins, recall notices, vehicle history, parts, and training) are presented with a "tabbed document metaphor". The technician can quickly switch between the different types of information available for a particular vehicle by a single click on a tab control. Service information is dynamically retrieved from database 38 and displayed on user interface 36 as synthesized "electronic manuals". A diagnostic element 44 allows the technician to diagnose a problem in a vehicle in either a symptom or system mode. VDS 10 allows the technician to drive the diagnosis process, rather than requiring the technician to follow the lead of the diagnostic author. Diagnostics element 44 mediates the technicians interaction with a number of screen displays with a back-end diagnostic interference engine—a rules based interference engine driven by a vehicle-specific set of interference rules. A tools display element 46 coupled via a diagnostic tool interface 48 displays the output of a diagnostic tool 50 attached to a vehicle.

VDS information structure 60 is a logical representation of service information found in VDS database 38. An information element (hereinafter "documents") is the basic unit for storing information in the VDS database and may include HTML pages, TIFF graphics files and other types of data files. All information to be accessed in VDS is via a hierarchical vehicle model consisting of systems, subsystems and components which are common to all YBE (year, body, engine) combinations of vehicles. Each document is attributed and accessed by vehicle (ie. year, body, engine augmented by vehicle build date and option sales codes), subject (ie. system, subsystem and components about which the document provides information), and information type (ie. a classification of the purpose for which the information is provided). Each VDS tab element contains primarily an exclusive subset of the information types about each subject.

Figure 3:
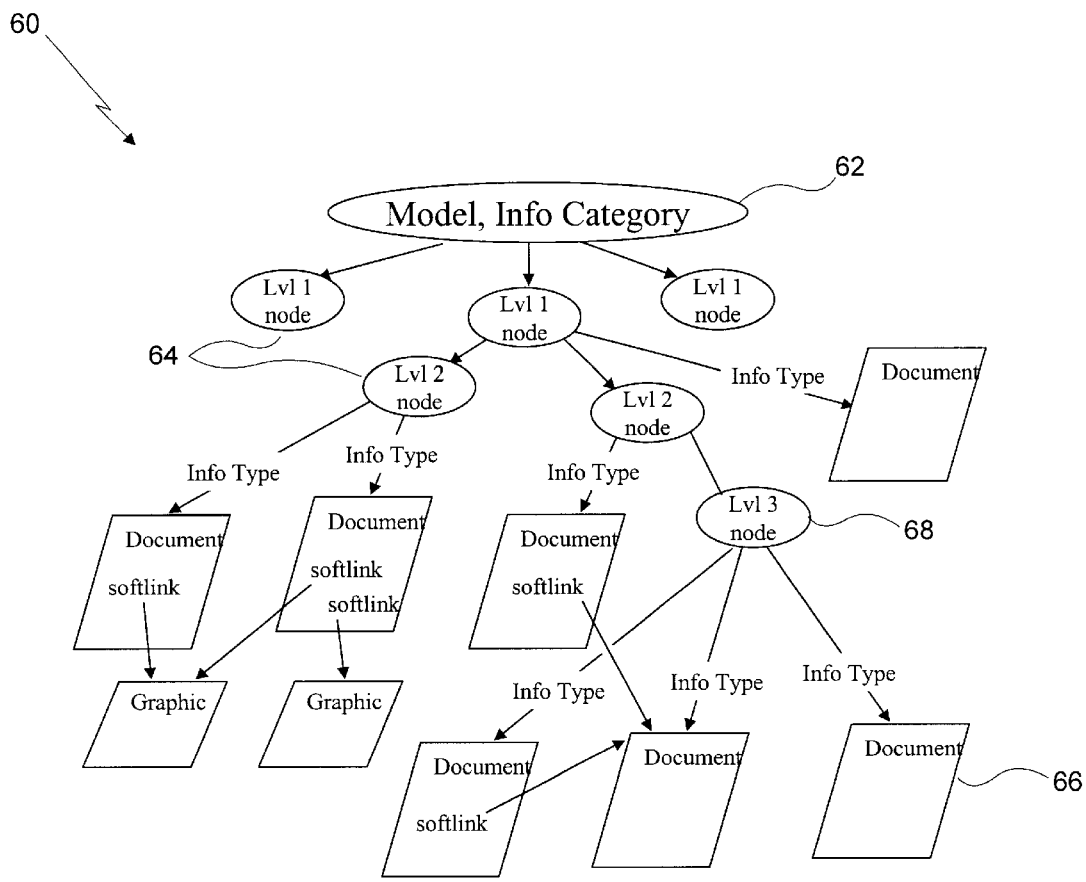
FIG. 3 is a diagram showing the information structure used by the vehicle diagnostic system of the present invention.

Information structure 60 is a collection of directed acrylic graphs, such that there is one graph for each car model and information category in the database. A schematic of one of these graphs is represented in FIG. 3. At the top of the graph is a route node 62 that represents a particular car model and information category. A car model is identified by (make, year, body, engine) tuple. An information category is associated with the tab under which the information is displayed. Information categories may include service manuals, wiring diagrams, technical service bulletins (TSBs) and recall notices, vehicle history, diagnostics, parts, and training. Each node 64 in the graph may parent other nodes below itself in the hierarchy. Although a graph may be arbitrarily deep, typical depth is expected to be no more than four nodes below the route node. A document 66 can be associated with any node 64 in the graph. This association is through an attribute called "information type" (e.g., theory of operation, adjustments, cleaning and inspection, description and operation). The node with which a document is associated by such an information type attribute is called the "subject" 68 of the document. The identity of a subject node 68 is uniquely defined by one path from route node 62 to subject node 68.

An important assumption about the VDS information structure is that different graphs for the same vehicle model have similar subject structures. Since nodes under a vehicle model are common across tabs, the subject provides a means of maintaining context as the user changes tabs. In addition, since a document is identical for many vehicle models, the documents are stored and maintained only once, but attributed to each of the vehicles for which it is appropriate. Documents providing links to other documents do so by referring to the subject and information type; this "softlinking" process is further discussed below. However, it is this information structure that allows a document to be written which can be used for numerous vehicle models over a period of time and ensures that the appropriate link can be made at runtime based on the current vehicle as specified by the user in session vehicle context.

Figures 4, 5:
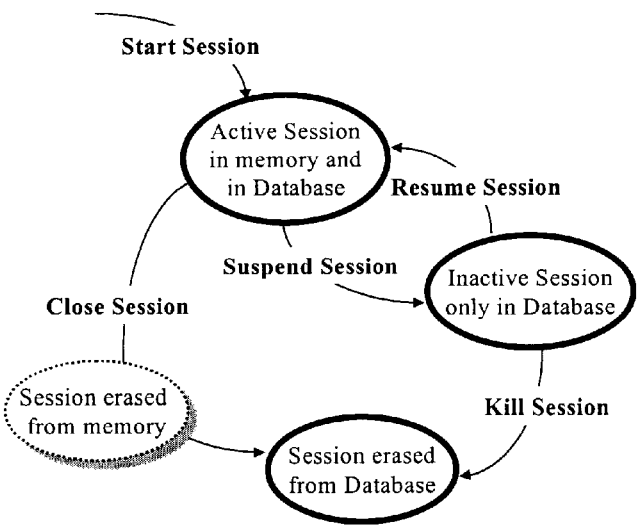
FIG. 4 is a flow chart depicting the states of a session established in the vehicle diagnostic system of the present invention.
FIG. 5 illustrates a change vehicle dialog box used in the vehicle diagnostic system of the present invention.

The basic VDS unit of operation is a session. A session represents a period of time in which a technician is working on a particular vehicle. VDS maintains state information in the VDS database to allow a technician to establish a session that can be saved and later restored. Before using VDS, a technician must login. Login establishes the technicians system identity so that the technicians preferences, as well as previously saved sessions can be accessed. Generally, a client in VDS supports the operation of a single session at any one time. Referring to FIG. 4, a session can be started, suspended, resumed, closed and killed. A session is started the first time a technician works on a vehicle. A technician can suspend the session and later resume it. A resume session is restored to the exact point that it was suspended. An active session can be closed, which entirely removes it from the system, or can be killed (removed without being made active and closed).

A new session begins when the technician, having logged into VDS, connects a diagnostic tool to a new vehicle or clicks the change vehicle button on the user interface. Either of these two actions will raise the change vehicle dialog box shown in FIG. 5. Each session is identified by a technician name, a vehicle identification number (VIN) or YBE (year, body, engine) number, and a version number. A session object is created in VDS database for each session and this object stores the context of the session. Each session is saved in the database as an inactive session object upon exit from the session. When a save session is resumed, VDS is restored to the same screen, information, and configuration as the technician saw when he or she left the session. There are also times when a new technician may need to use VDS. The change technician button on the change vehicle dialog enables a new technician to login. When the technician clicks the change technician button, the current session is suspended and the current technician is logged off the system. A login screen appears for logging in the new technician.

A session is resumed by picking a session name from the session list on the change vehicle dialog, or by attaching the diagnostic tool to a vehicle whose VIN is matched with a previous session. The inactive session object is retrieved from the database and activated. To select a session from the session list, the technician double clicks on the name of the session. The session appears in the state where the technician had last left that particular session. When a diagnostic tool is connected to a vehicle associated with a previous session, the change vehicle dialog screen appears with the corresponding completed information and the session name highlighted in the session list. The technician can then click the <ok> button to resume this session or choose to begin a new session.

A session is suspended when a technician clicks the <exit> button in the change vehicle dialog, when the technician invokes the change vehicle dialog, or when the work station operation is interrupted (for example, accidentally unplugged). A suspended session is stored as an inactive session in the database. The system identifies the session by technician name and VIN, and the session is placed in the session list for the technician to resume at a later time.

A YBE session is established when a technician needs to view the manuals for a type of car, he or she invokes the change vehicle dialog, leaves the VIN box blank and selects the year, body, and engine for the type of car in which the technician is interested. A YBE session gives the technician unconstrained information, such as TSBs, manuals, and wiring diagrams for a type of car, rather than for particular car. Similarly, a complex YBE session is when a technician needs to view the manuals for multiple types of vehicles such that the technician selects multiple YBEs from the YBE list of the change vehicle dialog. Neither a YBE session or a complex YBE session can be suspended, saved or resumed.

To manage the operation of sessions, VDS maintains state information, including technician context, vehicle context, and session context. Technician context is a collection of preferences for certain VDS feature options for a given technician. Initial values for technician context are established during a set up process when the technician is registered as a VDS user. Later, when a technician logs into VDS, the use of the system is conditioned by their technician context, and technicians may change their technician context (e.g., their preferences) via the appropriate user interface. Technician context attributes may include a technicians preferred language (i.e., English, French, Japanese, etc.), default printer location, preferred diagnostic mode (symptom-oriented or system-oriented), default tool template, or other preferred system features.

Vehicle context identifies the vehicle being diagnosed and its characteristics. Vehicle context may be generic or can specify a particular vehicle. A generic vehicle is specified by the tuple (make, year, body, engine), whereas a VIN uniquely identifies a particular vehicle. A vehicle can be further specified by its build date (because design changes may occur to a vehicle model over time) and by its sales code, which specifies the optional equipment that was built in or added to a particular vehicle. Additional attributes of interest (obtained from a system external to VDS) may include applicable warranties and a service history associated with a particular vehicle.

Accordingly, session context contains all of the information necessary to save and restore a session. The critical point is that session context contain enough information such that a restored session is indistinguishable from the session from which it was saved. Session context includes a reference to technician context, a reference to a vehicle context, current tab data that identifies the tab presently viewed in the user interface, and a collection of tab context data (one for each of the VDS application tabs) to the extent necessary to recreate the display. Tab context data contains the subject viewing in the tab, identifies the frame viewed, and contains a collection of frame context, including display elements and their geometry, an information reference for each display element, and an index to the line of information displayed at the top of the display element. Tab context contains sufficient information so that switching from one tab to another and then back to the original is indistinguishable from the situation where no switch operation was performed. Note that technician context and vehicle context are referenced rather than contained, since the lifetime of either is longer than that of session context.

Figure 6:
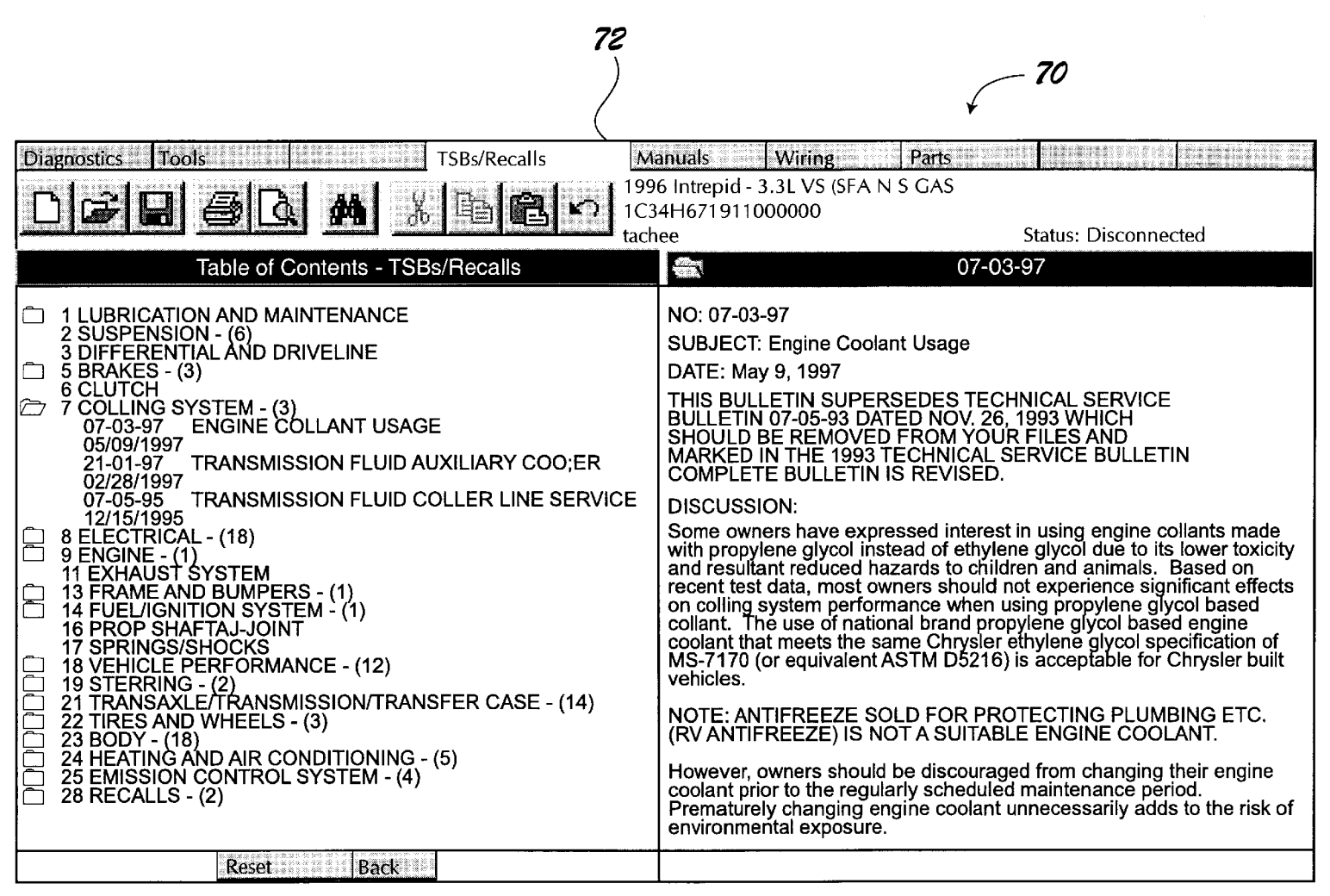

VDS user interface 70, an example of which is shown in FIG. 6, incorporates specifically designed characteristics to improve the usability of the system. For instance, a "tab metaphor" is employed so that a user can quickly navigate between the information categories, and a single window display, rather than cascaded windows, are used so that a user will not lose track of a window that is hidden beneath another. A tab 72 exists for each of the information categories that can access by the system. However, within each tab, multiple display frame configurations may be used to improve presentation of different groups of information. In FIG. 6, the TSB/Recalls tab is currently being displayed as a single window with two display frames (ie. TOC frame and text frame). VDS 10 makes extensive use of the information structure for navigating and displaying information. To navigate within VDS, a user may switch between tabs or may display another document within the tab by selecting a softlink; each of these features are further discussed below. Although VDS has been designed such that every softlink retrieves another document within the currently display tab, it is envisioned that softlink approach could be designed to retrieve documents from other tabs.

The information structure of session context in VDS permits a technician to switch from one application tab to another application in a context insensitive or a context sensitive manner. A context insensitive switch causes the destination tab to display whatever its current context references (ie. display the user interface the same way as when it was last accessed by the user). A context sensitive switch causes the destination tab to first obtain a context from the tab source, transform that to a reference in the destination tabs information structure and then display whatever the transformed context references. In essence in a context sensitive switch, one switches to the same place in the information structure of the destination tab as one came from in the source tab. For example, if a technician is viewing a document discussing fuel pumps under a service manuals tab, then a context sensitive switch to the wiring diagrams tab will display the wiring documents for a fuel pump.

Figure 7:
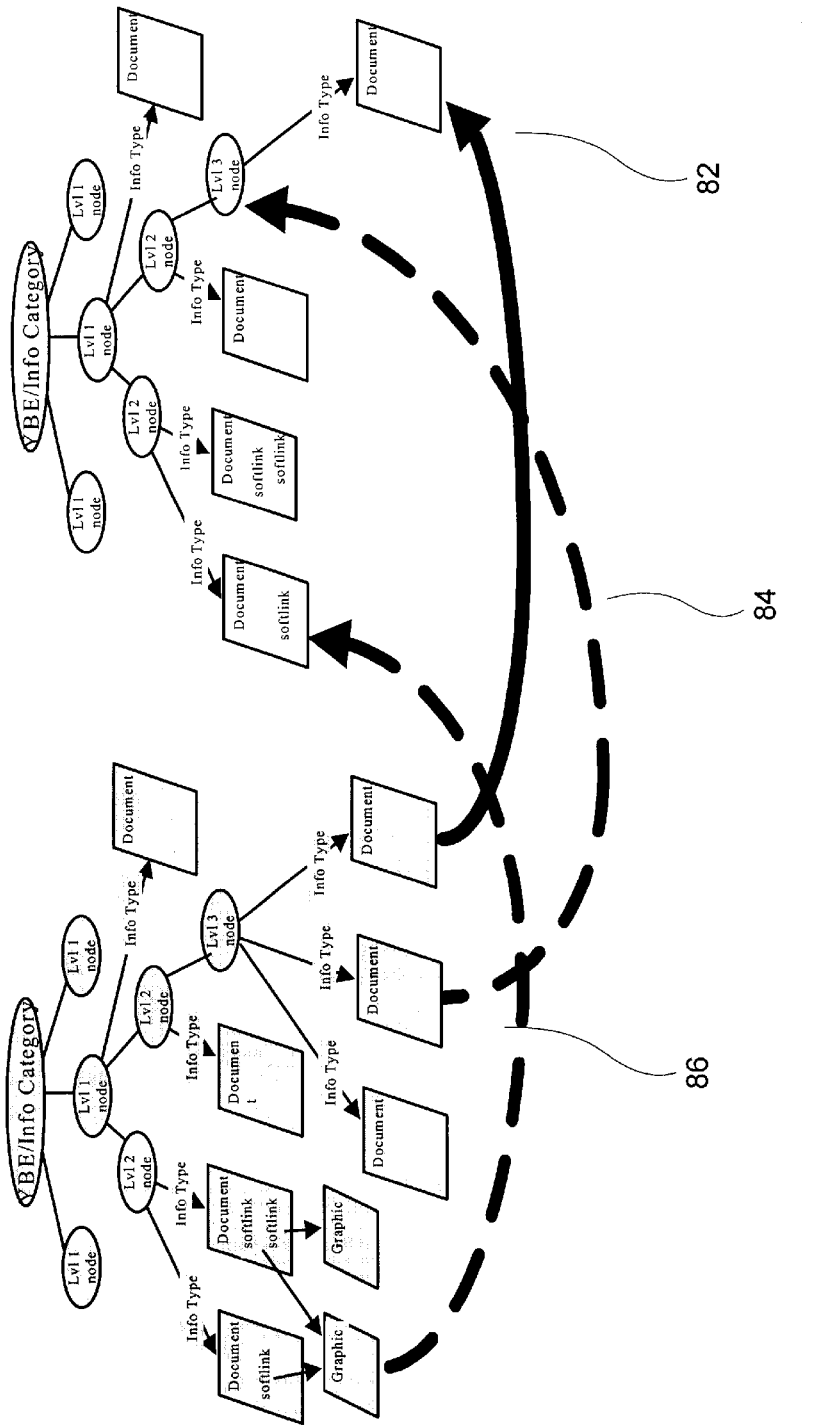
FIG. 7 is a diagram which depicts context sensitive tab switching in the vehicle diagnostic system of the present invention.

Conceptually, context sensitive tab switching is illustrated in FIG. 7. A first arrow 82 illustrates a simple case of switching from a place in one tab to the same place in another tab. However, there may not always be a directly corresponding destination document for each originating document. Second arrow 84 illustrates switching from a document in one tab to a place in another tab that is an ancestor of the document. Because there is no document in the destination tab that exactly corresponds to the context of the source tab, the target tab displays its table of context open to the appropriate spot, but does not display a document unless there is only one document at that node. A third arrow 86 illustrates an even more subtle problem. This switch is from a graphic in the originating tab that is pointed at by two documents in the originating tree. The place that is switched to in the destination tree is the document that corresponds to the document that one came from in the originating tree. In other words, the tab context for the target tab is established by the document in the originating tab that linked to the graphic.

A hyperlink is an image, word or phrase that appears in a document and is linked to information in other documents. Hyperlinks are the common means used for navigating the World Wide Web. In VDS, a document can also have links to another document; these links are called "softlinks". Softlinks differ from hypertext links in that they require additional context to resolve an absolute document reference. The use of softlinks allows the dynamic assembly of a technical manual or other information applicable to a specific vehicle model from the information in the database. Note that a document can have more than one place in the information structure, and thus a document may be referenced from more than one location within the information structure. For example, a document describing an alternator that is used in several car models may have several soft links that reference it, one from each of the car model structures.

Figure 8A:
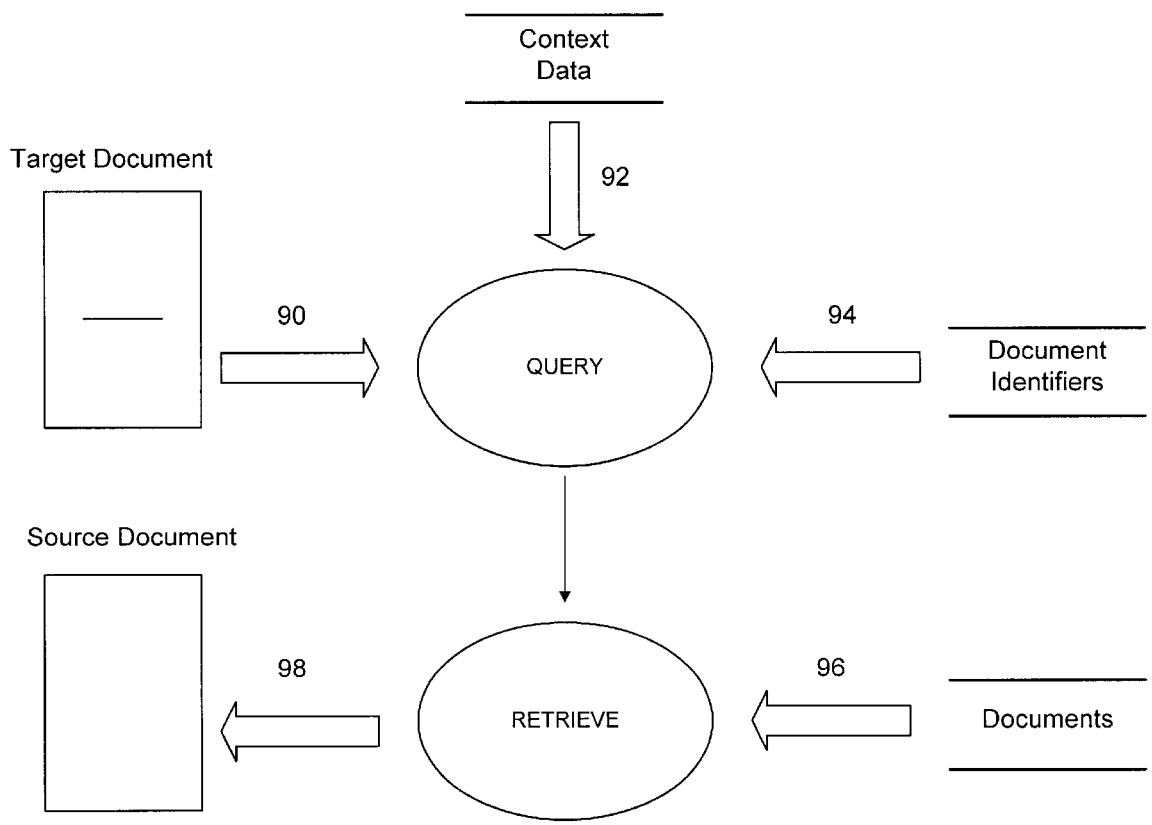
FIG. 8A is a diagram illustrating the softlink resolution function used in the vehicle diagnostic system of the present invention.
Figure 8B:
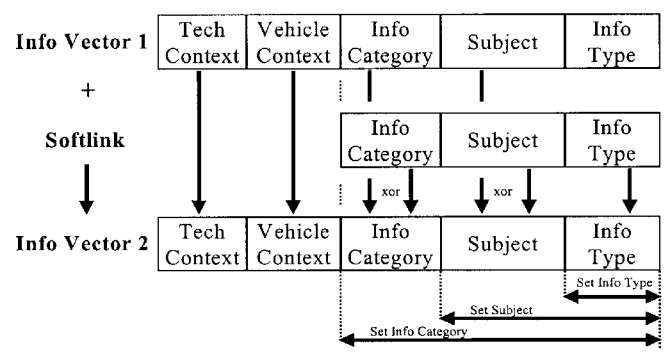
FIG. 8B illustrates the source information vector being combined with a softlink to create a target information vector in the present invention.
Figure 8C:
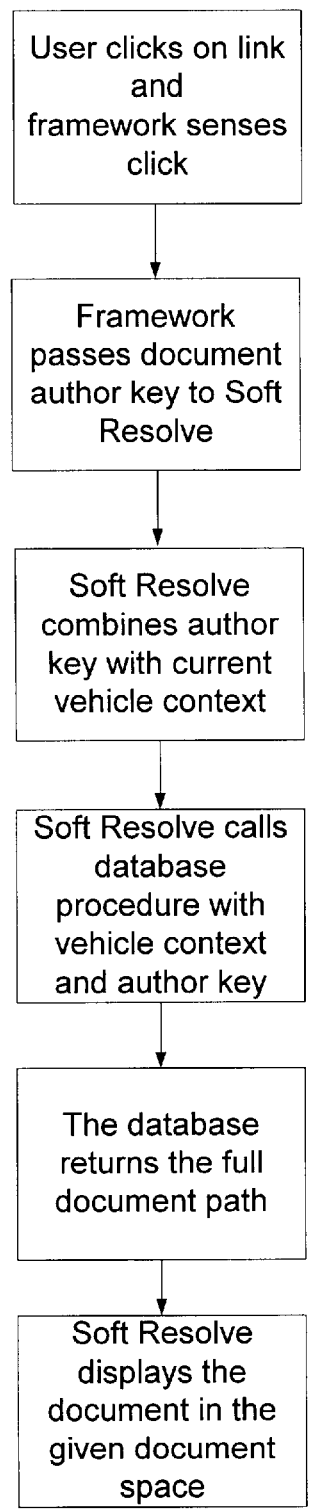
FIG. 8C is a flowchart for the softlink resolution function used in the vehicle diagnostic system of the present invention.

A document to be displayed by VDS is fully specified by an information vector which is composed of context data, including technician context, vehicle context, information category, subject, and information type. The softlink process occurs, as shown in FIG. 8A, after a link has been selected 90 in the current displayed document. A softlink request appends 92 context data to the link information, such that link information is indicative of the target document. As best seen in FIG. 8B, a softlink may replace either the information type, the subject and the information type, or the information category, subject and information type, and thus form an information vector for the target document. The target information vector serves as the basis of a query 94 against a data structure that contains unique file identifiers (ie. URLs) for each document in VDS. A unique file identifier can be used to retrieve 96 the target document from a server, and then display 98 it at the requesting client node. A flowchart illustrating the softlinking process has also been provided in FIG. 8C.

Figure 9:
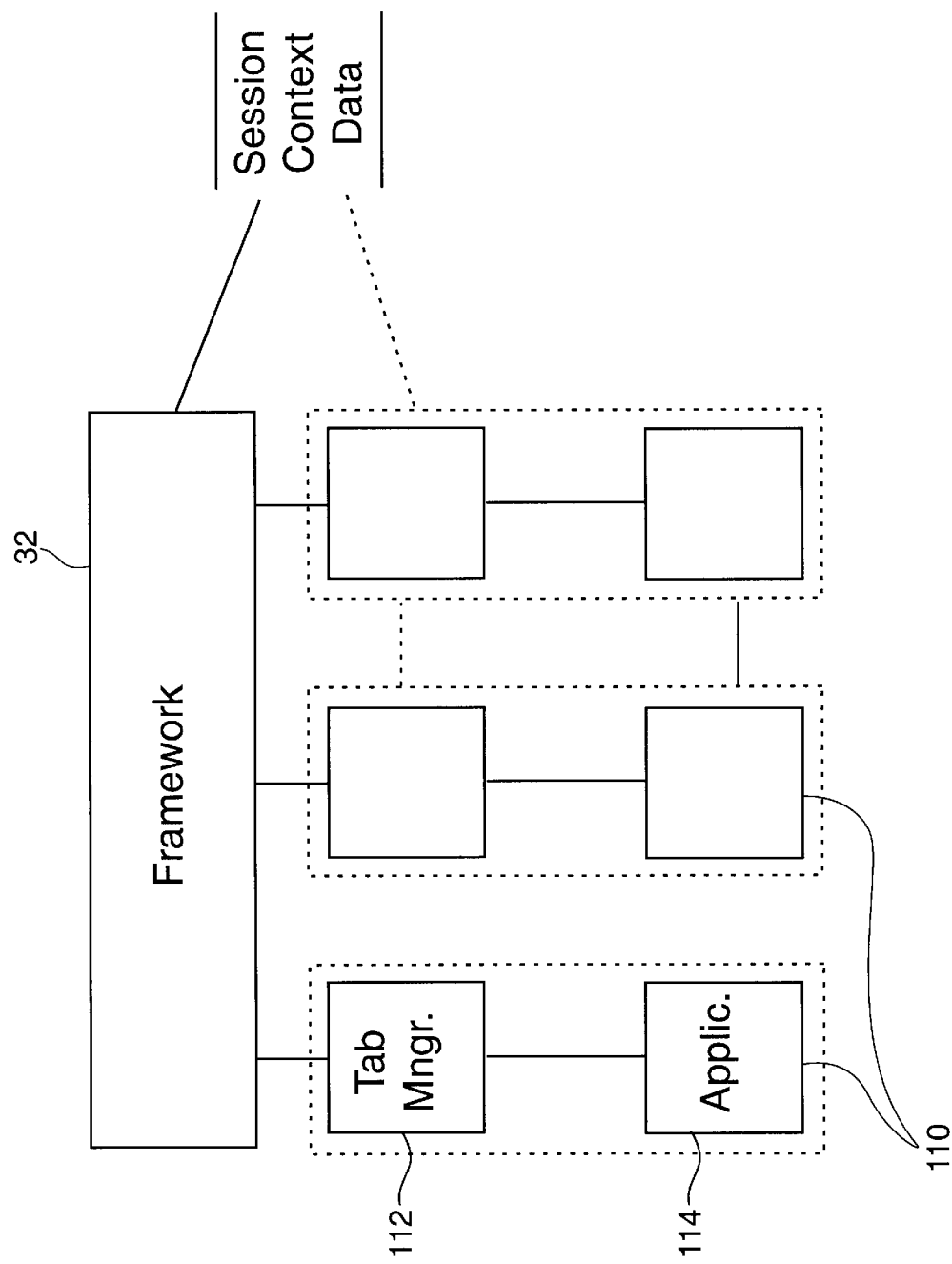
FIG. 9 is a block diagram showing a framework element as it relates to tab elements found in the vehicle diagnostic system of the present invention.

An overview of the VDS architecture is shown in FIG. 9. VDS is designed as a framework element 32 and a set of tab elements 110 (one for each display tab). Each tab element 110 further comprises a tab manager 112 and an application 114. Framework 32 and tab elements 110 share a session context data structure 116. Although framework 32 initializes session context, and is responsible for maintaining it in the VDS database, tab elements 110 can access session context data structure 116 in a read only manner. Tab elements 110 interface with a framework API to request changes to the session context data.

Generally, framework 32 is responsible for establishing a vehicle session and for initializing the individual tab managers. When tabs are started, framework element 32 informs tab manager 112 of its current context. Tab manager 112 will set its current context and start its associated application 114 by informing application 114 of its current context. When the user clicks on another tab, framework element 32 informs the current tab that it is being deactivated. Framework 32 requests from the tab its current context, and then informs the tab to save its state. If necessary, the tab manager informs the application to save its state. Finally, framework element 32 deactivates that tab. A new tab is activated by framework 32, and framework 32 proceeds to initialize the new tab and its context as just described. Therefore, framework element 32 has overall control of VDS applications. Tab managers 112 are responsible for specific tab function, and applications 114 under a tab perform the actual processing. A Table of Contents applet is an example of an application running under either the TSB, Manuals or Wiring tabs.

In terms of implementation, upon startup VDS runs Netscape Browser on the client node, which in turn initiates VDS framework element 32. Framework element 32 is coded in Java and designed to interface with Netscape Browser. In addition, numerous Java-coded applets are transmitted from the server node to the client node for use by VDS. Framework element 32 interfaces with Netscape Browser through the use of Java applets to provide the systems enhanced functionality.

Figure 10:
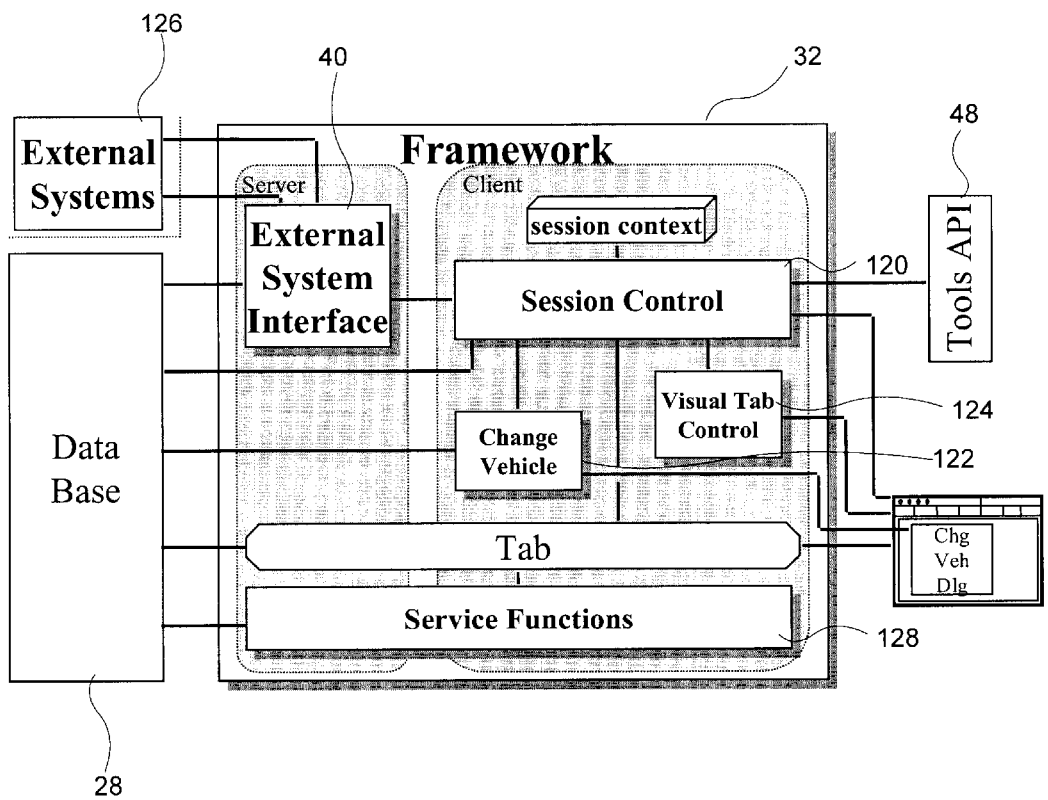
FIG. 10 is a block diagram showing the components of the framework element in the vehicle diagnostic system of the present invention.

In FIG. 10, a more detailed design of framework element 32 is shown. Framework element 32 provides session control functions 120, change vehicle functions 122, visual tab control functions 124, an external systems interface 40, and other framework service functions 126. Session control 120 is responsible for the following functions: handling technician log-in, controlling session management (including starting, suspending and resuming, and closing and killing sessions), controlling switching from one tab to another (including maintaining tab context information), and controlling the configuration of VDS displays.

Change vehicle control 122 is implemented using a Java applet which creates the change vehicle dialog box and establishes this dialogues behavior. Change vehicle control 122 is activated by session control 120 upon a change vehicle event that may be initiated by either the change vehicle button or a new VIN being detected by a diagnostic tool. Change vehicle control 122 tracks and controls the interaction of the change vehicle dialog with the technician, and uses a database access method, such as JDBC, to read information from database 38 and to load the change vehicle dialogues fields.

Similarly, visual tab control 124 is implemented using a Java applet which creates the tab control which is used by the technician to switch between the various tab elements. Each tab control has the appearance of file tabs that the operator may click on. The sensitivity of an individual file tab is controllable such that an insensitive file tab ignores an operators mouse clicks and a sensitive file tab is physically different from that of an insensitive one.

An external system interface 40 provides the required interface and functionality between VDS and the interface mechanisms provided by external systems 128. For instance, VDS may interface to the corporate computer system that contains additional warranty information; this existing system may connect dealerships to the manufacturer via a satellite link and thus support critical business functions on an ongoing basis. External system interface 40 is a server process that excepts requests for vehicle information about a particular VIN from the framework's session control 120, and brokers these requests to existing external systems 128. Asynchronously, and after a possible delay, an external system responds to the requests. External system interface 40 receives these responses and inserts the information received into VDS database 38 and then informs the appropriate session control client of the presence of the data. Consistent with the server/browser architecture of VDS, the information that has been communicated by external system interface 40 is inserted into VDS database 38 in the form of an HTML page. Therefore, by converting the raw information received from an external system into HTML format, dependencies on external format are eliminated, thus isolating VDS from any external format changes.

To provide consistency within VDS, framework element 32 also contains a collection of service functions 128, such as a help/coach function, a technician notes function, vehicle log service, system log service, and miscellaneous printing services. The help/coach function is a goal-based, online help documentation that assists the technicians to use VDS. Documentation is indexed by the goal, and cross-indexed by the screens that can accomplish a particular goal. In operation, help/coach function queries VDS to determine the current screen and presents information pertinent to that screen and the goals that can be accomplished from that screen. Technician notes are annotations that a technician can apply to various VDS objects. The intent is to allow a technician to annotate any VDS information entity, such as a service procedure for a particular vehicle model. Vehicle log service logs important events that occur during a vehicle diagnostic session that may be useful for analyzing a session; whereas system log service records informational, warning and error types of entries that are useful for analyzing system operation. These are a few of the service functions that may be performed by framework element 32.

Figure 11:
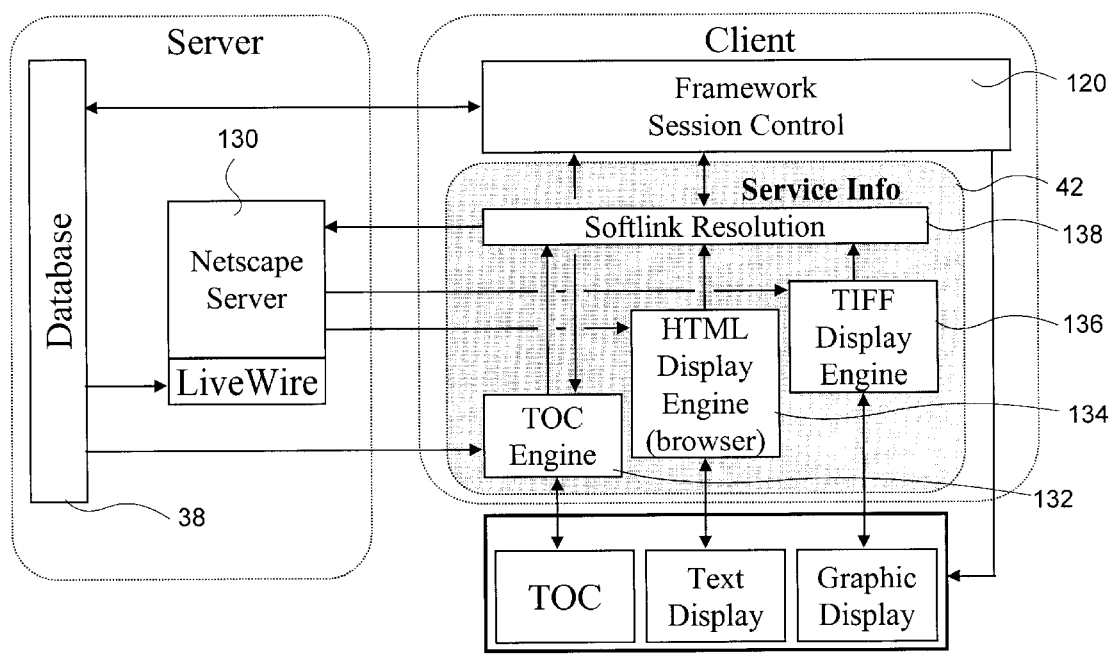
FIG. 11 is a block diagram showing the components of the service information element in the vehicle diagnostic system of the present invention.

Generally, service information element 42 allows a technician to browse vehicle information in VDS. While much of its functionality is provided by Netscape server and Netscape browser, FIG. 11 illustrates the architectural design for service information element 42. Service information element 42 interfaces with framework session control 120 in order to receive the current session context information. This interface is bidirectional because service information element 42 updates the current session context (i.e., tab context for the appropriate tab) with subject information as the technician browses the information hierarchy. Framework session control 120 also establishes the screen configuration (ie. a specific arrangement of Netscape browser frames), and thus directly interfaces with the Netscape browser to create frames.

Service information element 42 interfaces directly with database 38 to read the VDS information structure for generating a table of contents display. Table of contents engine 132 is a Java applet that constructs the display in a named browser frame. Generally, a table of contents (TOC) is constructed from an information structure graph. By treating a document as a node, recursively following the graph horizontally across a level, and listing a label for each node within a level, a table of contents may be constructed from a graph.

Service information element 42 also interfaces with database 38 through a Netscape server 130 to request text and graphic information for a hypertext display engine 134 and a graphics display engine 136. Hypertext display engine 134 uses a standard Netscape browser frame to display standard HTML pages; whereas graphics display engine 136 requires custom plug-ins (coded in Visual C++) to display TIFF group 4 and CGM format graphics. Graphics display engine 136 may also be designed to allow a system user to control zooming or panning of graphics data within the display and other graphics display functionality.

In either case, softlink resolution (SR) function 138 resolves "softlinks" when requested by the various display engines. Since the display configuration may have to change, SR function 138 sends the softlink request to framework session control 120 and requests notification. After framework session control 120 notifies SR function 138 that the display configuration is correct, including the name of the target frame, SR function 138 appends the target frame to the softlink, formulates the softlink into an URL (as discussed above), and sends the URL to Netscape server 130. To coordinate the framework session control function of creating frames with the softlink resolution function of requesting targeted URLs, the frame must exist before the request for a targeted URL is issued.

Diagnostic element 44 allows a technician to choose either symptom-based or system-based diagnostic mode. In symptom mode, the user interface displays a frame symptoms, causes and tests. Symptoms are entered or changed by a technician from a list of known symptoms available from the diagnostic engine or from diagnostic trouble codes that are read from the vehicle via diagnostic tools. A list of potential causes and a list of available tests are dynamically updated based on chosen symptoms. These list are displayed in ranked order by likelihood for the causes and by a factor which considers the time that the test takes to execute, the cost of executing the test and the number of potential causes that may be exonerated or convicted. A technician may manually exonerate or implicate a cause for the symptom(s) displayed, and diagnostic element 44 updates and re-displays each frame. If a test is chosen, then the test procedure is displayed (in place of the symptom list). Each test procedure may consist of technician-performed actions, procedure-directed measurements through a diagnostic tool API or a mixture of both. On the other hand, system mode allows a technician to choose which system may be exhibiting a problem. As the technician drills down the system hierarchy, appropriate cause and tests to exonerate or convict causes for system failure are listed, and the cause and test displays work in the same way as in the symptom-based mode. Thus, in the user interface, a list of systems replaces the list of symptoms.

Figure 12:
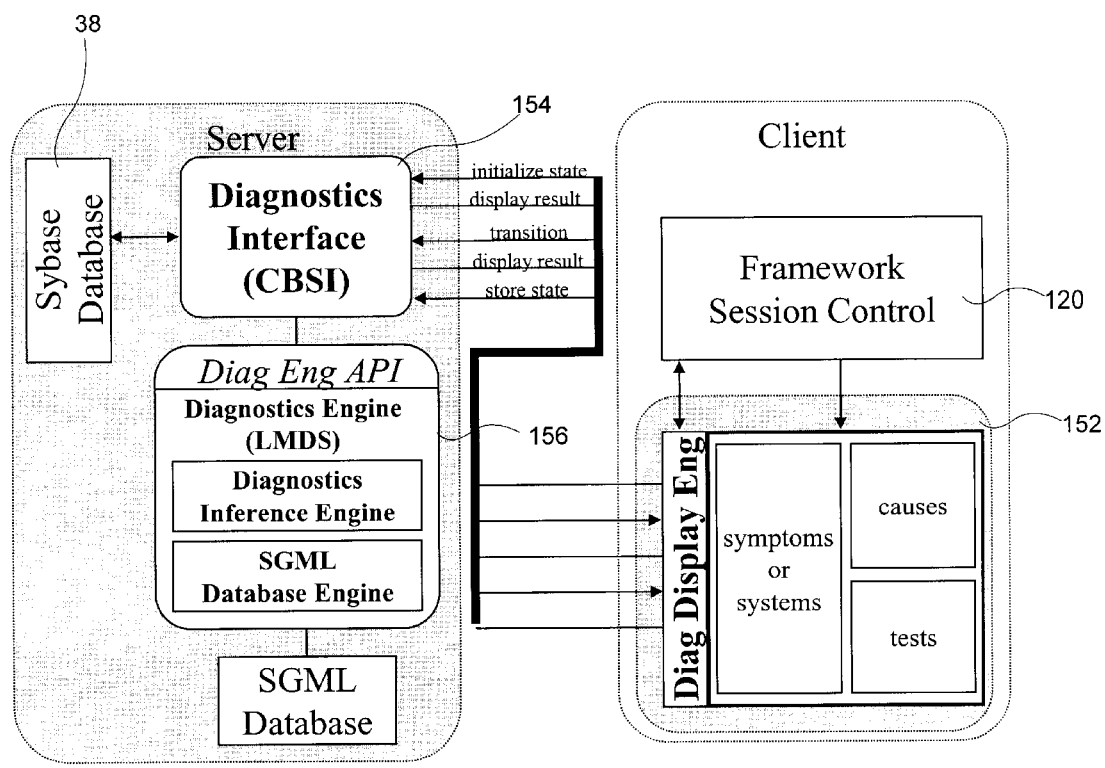
FIG. 12 is a block diagram showing the components of the diagnostic element in the vehicle diagnostic system of the present invention.

As seen in FIG. 12, diagnostics element 44 comprises a diagnostic display engine 152, a diagnostic interface 154 and a diagnostic engine 156. Diagnostic interface 154 connects to database 38 and to diagnostic engine 156. Diagnostic engine 156 is a rules-based inference engine that uses a rule set coded in database 38; it resides on the server node and interfaces with the various diagnostic element components through an API to provide diagnostic information. Diagnostic display engine 152 resides on the client node and produces the diagnostic displays that interact with the technician; it connects with diagnostic interface 154 to communicate with diagnostic engine 156, and with framework session control 120 for tab management and screen configuration functions.

Figure 13:
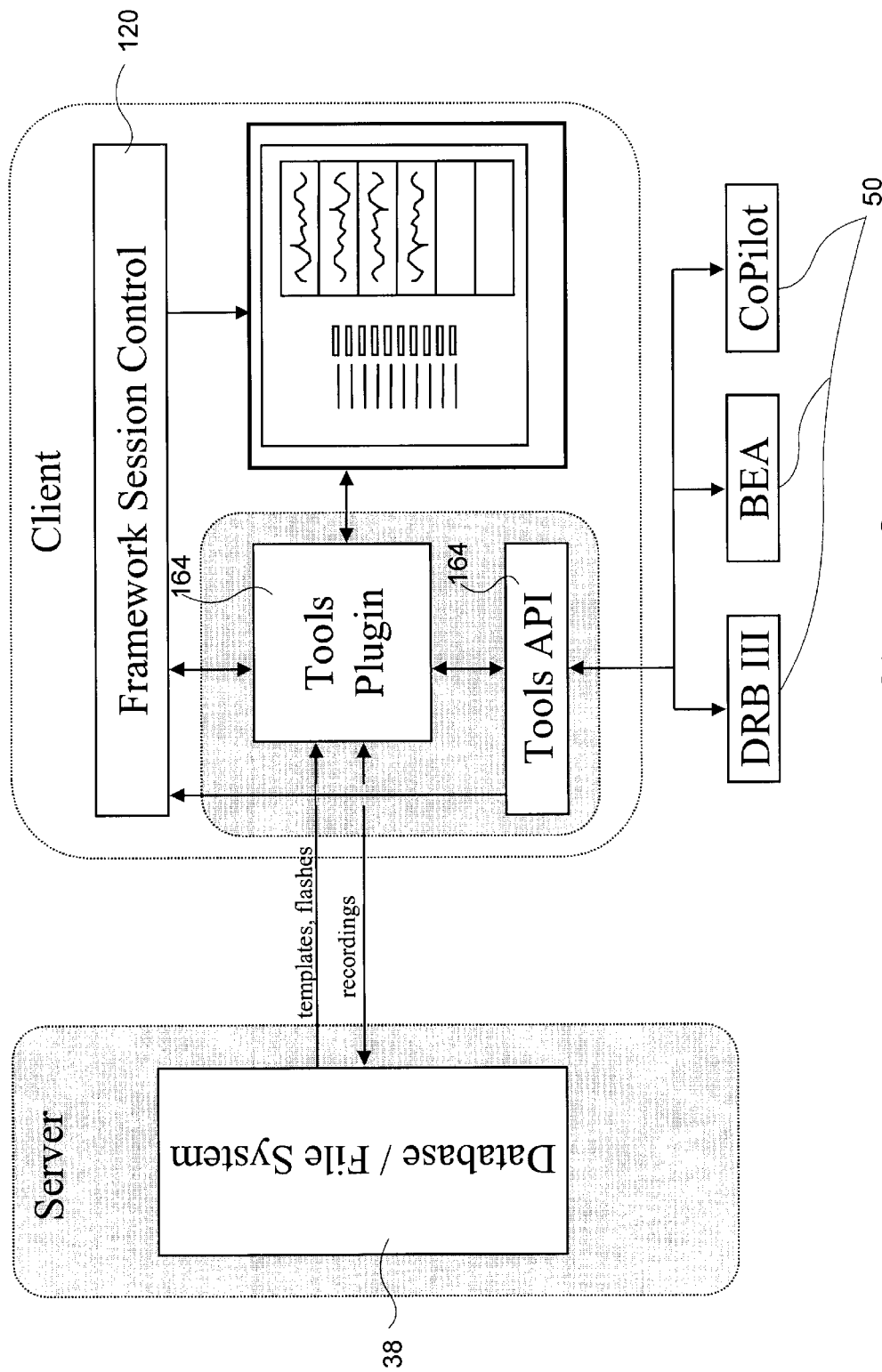
FIG. 13 is a block diagram showing the components of the tools element in the vehicle diagnostic system of the present invention.

A tools element 46 displays the output of a diagnostic tool 50 attached to the vehicle. As seen in FIG. 13, a tools API 162 connects the vehicle instruction drivers to VDS through a tools plug-in 164. Tools plug-in 164 generates the tool display in a browser frame and interfaces with framework session control 120 for session context and tab management. The interaction of framework with tools plug-in 164 requires coordination. This following scenario discusses a concept of how this coordination might work:

The framework creates a frame for tools and uses the embedded tag to load the tools plug-in by sending URLs to the server that loads HTML, which performs these functions.

When the browser loads the tools plug-in, the browser calls the plug-in function NPP_New( ).

The plug-in NPP_New( ) implementation calls the framework session control function getSessionContext( ), which returns a SessionContext.

The SessionContext includes:
        TechnicianContext, which specifies language
        VehicleContex, which specifies vehicle model (make, year, body, engine), VIN, build date, and sales codes
        Tab context, which specifies information category, subject, and information type
        A reference to a tools-private context, which is null the first time that tools in entered for a session The first time that the NPP_New( ) is called for a session (flagged by the fact that the tools-private context is null), NPP_New( ) allocates "permanent" memory (memory that remains allocated over a tab switch), sets up its private context, and sets the reference in tools TabContext to this memory. (This assignment has to get back to the "real" copy of the SessionContext.)

The tools plug-in begins processing, as directed by its private context. This processing may involve acquiring a template, initiating a datastream from the vehicle, and displaying data. This is probably done in a separate thread so that the plug-in can return to the browser.

When the framework gets a tab switch, or some other reason to terminate the tools plug-in, it calls the plug-in function NotifyShutdownPending( ) to tell it that a tab switch is about to happen.

In NotifyShutdownPending( ), the plug-in can do some cleanup (e.g., shutdown the DRB datastream). If the plug-in needs to deal with the operator (e.g., to ask the operator if the template needs to be saved), the plug-in can post a dialog and return from this call.

The framework waits—it doesn't terminate the plug-in yet. When the plug-in is definitely ready to die, it calls the framework back at a framework ShutdownOK( ) function.

The framework, upon this asynchronous callback (or optionally on the return of the initial call as indicated by some flag) then initiates a new HTML load, which destroys the plug-in page.

The browser calls the plug-in at the NPP_Destroy( ) entry point, and the plug-in, which already knows it is dying, dies. The point of the NotifyShutdownPending( )/ShutdownOK( ) tango is that there is little that the plug-in can do in the NPP_Destroy( ) call, other than deallocate memory and return to the browser. For example, it cannot post a dialog.

Tools plug-in 164 must deallocate the tools-private context at some point upon notification from framework element 32 that the session is dying. Diagnostic tools 50 used in conjunction with VDS may include a basic engine analyzer (BEA), DRBIII (ie. a proprietary hand-held tool capable of communicating with various controllers on a vehicle) or Co-Pilot (a temporarily installed device used to diagnose intermittent problems).

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A method of operating a vehicle diagnostic system in order to access files in a vehicle information system having at least one client node connected to a server node across a network channel comprising the steps of:

establishing a diagnostic session for a motor vehicle, including coupling a diagnostic tool between the vehicle diagnostic system and the motor vehicle;

accessing a first file on said client node, said first file having vehicle information for a first type vehicle;

identifying vehicle context information associated with said first file, said vehicle context information is indicative of said first type of vehicle;

selecting a softlink in said first file, where the softlink is indicative of subject matter information for a second file and the softlink is not a unique file identifier for said second file;

determining a unique file identifier for said second file based on said vehicle context information and said subject matter information;

retrieving said second file from said server node via said network channel using said unique file identifier;

accessing said second file on said client node;

saving said vehicle context information and said subject matter information for said second file in a session object, thereby facilitating retrieval of said second file at a later time.

2. The method of claim 1 wherein said step of determining a file identifier further comprises accessing a data structure using said vehicle context information and said subject matter information, thereby retrieving said file identifier.

3. The method of claim 1 wherein said context information includes one or more vehicle identifiers selected from a group consisting of a vehicle model identifier, a vehicle make identifier, a vehicle year identifier, a vehicle engine identifier, and a vehicle identification number.

4. The method of claim 1 wherein said client node comprises a computer-human interface module for accessing said first and said second file, and a memory accessible by said interface module for storing said context information.

5. The method of claim 1 wherein said first file and said second file are stored in a database residing on said server node and are retrieved by said interface module using said file identifier.

6. The method of claim 1 wherein at least one of said first file and said second file are stored in hypertext markup format and said link is further defined as a hyperlink.

7. A method of obtaining vehicle diagnostic information by browsing documents containing vehicle information using a vehicle information system, the vehicle information system having at least one client node connected to a server node across a network channel comprising the steps of:

establishing a diagnostic session for a motor vehicle, including coupling a diagnostic tool between the vehicle diagnostic system and the motor vehicle;

displaying a first document on a client node, said first document having vehicle information for a first type of vehicle;

identifying vehicle context information from said first document, said vehicle context information is indicative of said first type of vehicle;

selecting a hyperlink in said first document, where said hyperlink is indicative of subject matter information for a second document and said hyperlink is not a unique file identifier for said second document;

combining the vehicle context information from said first document and said subject matter information from said second document in order to form a unique file identifier for the second document;

retrieving said second document from said server node via said network channel using said unique file identifier; and displaying said second document on said client node.

8. The method of claim 7 wherein said step of determining a file identifier further comprises accessing a data structure using said vehicle context information and said subject matter information, thereby retrieving said file identifier.

9. The method of claim 7 wherein said context information includes one or more vehicle identifiers selected from a group consisting of a vehicle model identifier, a vehicle make identifier, a vehicle year identifier, a vehicle engine identifier, and a vehicle identification number.

10. The method of claim 7 wherein said client node comprises a computer-human interface module for displaying said first document and said second document, and a memory accessible by said interface module for storing said context information.

11. The method of claim 7 wherein said first document and said second document are stored in a database residing on said server node and are retrieved by said interface module using said file identifier.

12. The method of claim 7 wherein at least one of said first document and said second document are stored in hypertext markup format, and said link is further defined as a hyperlink.

* * * * *